United States Patent
Tsubata

(10) Patent No.: US 6,217,339 B1
(45) Date of Patent: Apr. 17, 2001

(54) POWER SOURCE CONNECTING APPARATUS AND ELECTRONIC APPLIANCE HAVING THE SAME POWER SOURCE CONNECTING APPARATUS

(75) Inventor: Keisuke Tsubata, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/347,354

(22) Filed: Jul. 6, 1999

(30) Foreign Application Priority Data

Jul. 7, 1998 (JP) ................................................. 10-191861

(51) Int. Cl.$^7$ ..................................................... H01R 11/30
(52) U.S. Cl. ............................................... 439/38; 439/500
(58) Field of Search ............................... 439/38–40, 188, 439/754, 500

(56) References Cited

U.S. PATENT DOCUMENTS

| | | | |
|---|---|---|---|
| 3,521,216 | * | 7/1970 | Tolegian ................................. 439/39 |
| 4,317,969 | * | 3/1982 | Riegler et al. ......................... 439/39 |
| 4,451,113 | * | 5/1984 | Zuniga .................................. 439/38 |
| 4,647,120 | | 3/1987 | Karabakakis ...................... 339/12 R |
| 5,726,885 | | 3/1998 | Klein et al. ................... 364/423.098 |
| 5,779,487 | * | 7/1998 | Gatin ..................................... 439/39 |
| 5,829,987 | * | 11/1998 | Fritsch et al. ......................... 439/38 |

FOREIGN PATENT DOCUMENTS

| | | | |
|---|---|---|---|
| 94 02952 | * | 2/1994 | (WO) ..................................... 439/38 |
| WO9809346 | | 3/1998 | (WO) . |

* cited by examiner

Primary Examiner—Hien Vu
(74) Attorney, Agent, or Firm—Adams & Wilks

(57) ABSTRACT

A main body case on an electronic appliance side is provided with an external terminal. Within the main body case, an internal terminal is arranged opposite to the external terminal. The internal terminal is supported by a compression coiled spring in a conical form. The internal terminal is connected to a secondary battery, and the secondary battery is connected to an electronic circuit for an electronic appliance. A magnet is provided at a tip of a charger, and charger side-terminals are attached on both sides of the magnet. The charger side-terminal is connected to a primary battery internally provided in the charger. When the magnet of the charger is fitted with a groove of the external terminal, the internal terminal is attracted by a magnetic force and contacted with the external terminal. Due to this, the charger side-terminal and the internal terminal are brought into electrical connection through the external terminal, enabling charging.

16 Claims, 10 Drawing Sheets

POWER SOURCE CONNECTING APPARATUS AND ELECTRONIC APPLIANCE HAVING THE SAME POWER SOURCE CONNECTING APPARATUS

BACKGROUND OF THE INVENTION

1. Field of the Invention

This invention relates to a power source connecting apparatus for an electronic appliance, and more specifically to a power source connecting apparatus for an electronic appliance which is constructed such that current leakage hardly occur and airtightness will not diminish.

2. Description of the Prior Art

Recently, there is a tendency toward increase in electric timepiece power consumption as the electronic timepiece functionality increases. For example, power consumption is considerably increased for those electronic timepieces provided with a personal computer function and those with television function. Accordingly they require a large-sized power source suited for them. On the other hand, watches are usually worn on a wrist during walking. Accordingly, they if large-sized, they are poor in appearance and obstructive, and tiring if heavy. Meanwhile, the frequent replacement of a small capacity battery requires opening of the battery lid in each time, hence resulting in troublesomeness. For these reasons, a variety of devices have been implemented for timepiece power sources. For example, JP-A-51-30773 discloses a timepiece incorporating a power source (secondary battery) of an electricity charging type.

FIG. 9 is a schematic explanatory view showing one example of the above-described electronic timepiece. FIG. 10 is a sectional view showing a power source connecting apparatus for the timepiece shown in FIG. 9. This electronic timepiece 500 is structured to have a charge terminal 502 provided on a side face of a main body case 501. The main body case 501 is fitted with a bushing 504 holding an electrode 503. The bushing 504 is slidable relative to the main body case 501. Meanwhile, a packing 505 for waterproofing is provided between the bushing 504 and the main body case 501. The bush 504 is urged toward the main body case 501 side by a spring member 506. A spring electrode 507 is arranged underneath the electrode 503. This spring electrode 507 is fixed inside the main body case 501, and has an end connected to a secondary battery 508. A charging power source (primary battery) 509 is connected with a socket 510. The socket 510 is projected with an electrode 511 at a front end thereof. The electrode 511 is electrically connected to the charging power source 509. Also, the socket 510 has a thread 512 cut at its end to be screwed to a internal thread 513 of the main body case 501.

First, if the socket 510 is screwed to the internal thread 513 in the main body case 501, the bushing 504 is pushed inside the main body case 501 while being urged by the spring member 506. Also, the electrode 511 on the socket 510 side comes in contact with the electrode 503 on the bushing 504 side. On the other hand, the electrode 503 is pressed to an inside of the main body case 501 due to the movement of the bushing 504, and the electrode 503 at its lower end comes into connection with the spring electrode 507. Due to this, electrical connection is obtained between the charging power source 509 and the secondary battery 508. In a usual use state, the charging power source 509 is removed. In this state, because the spring member 506 urges against the bushing 504, the packing 505 is sandwiched between a flange 504 of the bushing 504 and the main body case 501, keeping airtight the timepiece.

In the above-described electronic timepiece 500, the electrode 503 is left exposed. Due to this, if a conductive object is contacted therewith, the electrode 503 is put into connection with the secondary battery 508 thereby posing a problem of current leakage. Meanwhile, although the packing 505 is clamped to maintain airtightness by the urging force of the spring member 506, there has been a problem in that the airtightness decreases if the bushing 504 is externally pushed in.

Also, in the publication of JP-A-51-30773, there is a description on a charge terminal with a lid (FIG. 3 and FIG. 4 in the same publication). However, if a lid is provided, there is a problem in that removing the lid is troublesome. Also, the lid is a small part, resulting in a problem in of less The problems are not limited to the timepieces but they are common problems to electronic appliances having charge terminals.

Accordingly, this invention has been made in view of the above-described circumstances, and it is an object to provide a power source connecting apparatus which fulfills conditions of reduced current leakage, no decrease in airtightness, ease in power source connecting operation and no missing of parts, and an electronic appliance provided with this power source connecting apparatus.

SUMMARY OF THE INVENTION

In order to achieve the above-stated object, in a power source connecting apparatus according to the present invention, a power source connecting apparatus was structured by having a fixing portion, an internal terminal having a first power source terminal and held at the fixing portion by a elastic member, an external terminal provided in a position of the fixing portion opposite to the internal terminal so as to be exposed to a side opposite to a side that the internal terminal is arranged, such that the first power source terminal and the external terminal are brought into a conduction state when the internal terminal is contacted against the elastic member with the external terminal.

In this structure, structuring can be made such that the internal terminal has a magnetic member, and the internal terminal is brought into contact against the elastic member with the external terminal by the magnetic member being attracted through a magnetic force.

Furthermore, a power source connecting apparatus can be structured by providing, in addition to the above structure, with a second power source terminal provided in a position opposite to the external terminal and a connection terminal having a magnet to cause an attractive force between the internal terminal and the same.

Also, in an electronic appliance according to the present Invention, an electronic appliance was structured by being provided with the power source connecting apparatus having the above structure and having a main body case fixing the fixing portion and an electronic circuit incorporated in the main body case and connected to the first power source terminal.

In this structure, structuring can be made by providing in the main body case the secondary battery as a power source for the electronic appliance and connecting the first power source terminal to this secondary battery.

Also, in the structure provided with the connection terminal, the power source apparatus may be connected to the second power source terminal provided on this connection terminal.

In the power source connecting apparatus structured as above, for example in a structure having a connection terminal having a magnet, if the magnet of the connection terminal is contacted with the external terminal, the internal terminal is attracted by the attraction force of the magnet. This causes the internal terminal and the external terminal to be brought into contact. In this state, if the connection terminal is contacted with the external terminal, connection is also made between the connection terminal and the internal terminal. In a structure that the second power source terminal of the connection terminal is connected with a power source apparatus and the internal terminal is connected with an electronic circuit or secondary battery, in this state power is supplied from the power source apparatus through this power source connecting apparatus to the electronic circuit or secondary battery.

On the other hand, in a state that the connection terminal is separated from the external terminal, no attractive force of the magnet operates and the action of the elastic member brings the internal terminal and the external terminal into an separate state. Due to this, even if the external terminal is touched from an outside, no current leaks to an outside.

Also, the external terminal is provided over between the inner side and the outer side of the fixing portion, this power source connecting apparatus itself is made to maintain airtightness at a front and back of the fixing portion. Accordingly, if the fixing portion is attached to the main body case of the electronic appliance to keep airtightness, it is possible to maintain airtightness also within the electronic appliance. Furthermore, because power source connection is possible only by attracting the inner terminal by the magnet and contacting the charger side-terminal with the external terminal, connection operation is easy. Also, no lid is necessary and no parts are likely to be lost or misplaced.

BRIEF DESICRIPTION OF THE DRAWINGS

A preferred form of the present invention is illustrated in the accompanying drawings in which.

DETAILED DESCRIPTION OF THE PREFERRED EMBODIMENTS

Hereunder, this invention will be explained in detail with reference to the drawings. It should be noted that this invention is not to be limited by the embodiments.

(Embodiments 1)

Figure 1:
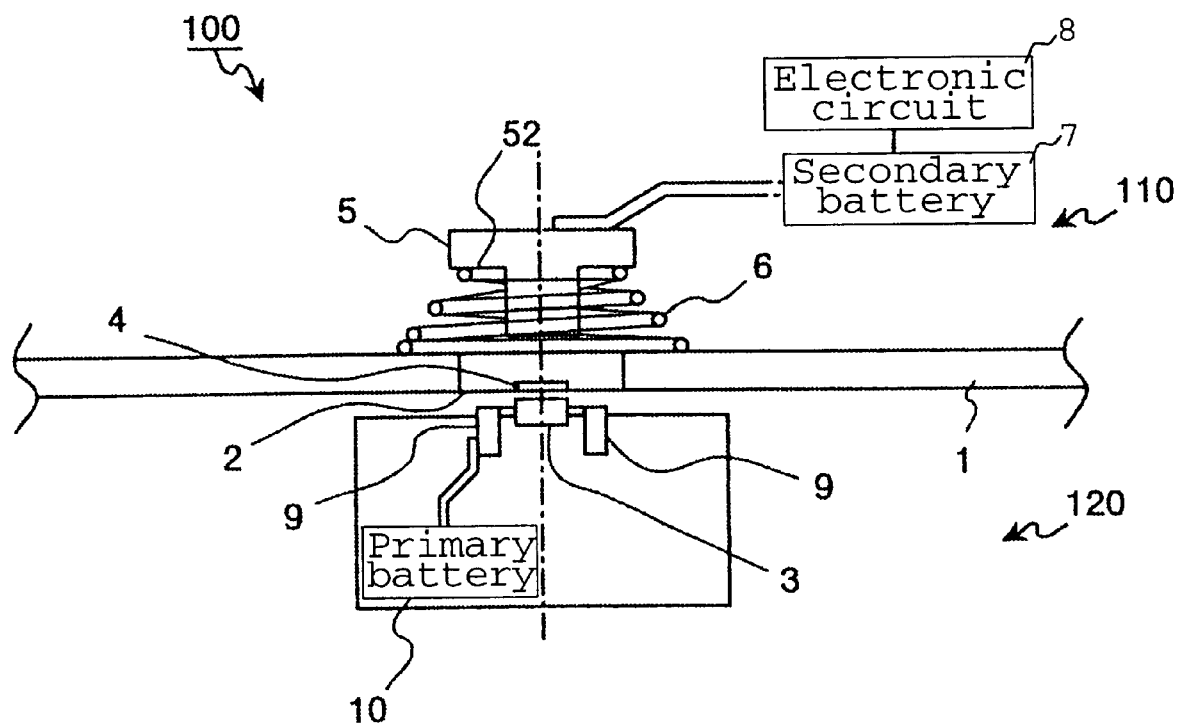
FIG. 1 is a sectional explanatory view showing a power source connecting apparatus for an electronic timepiece according to Embodiment 1 of this invention.
Figure 2:
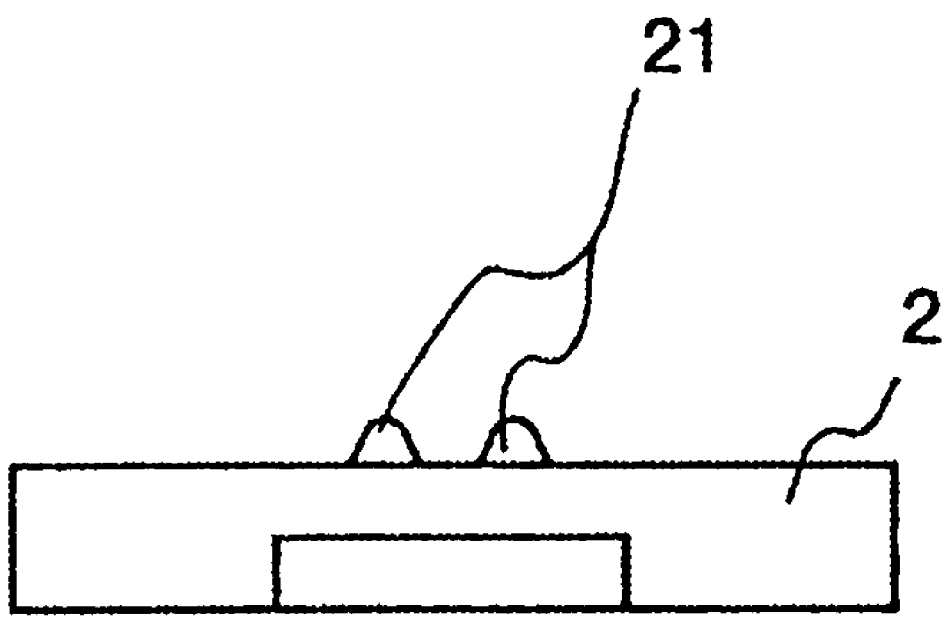
FIG. 2 is an explanatory view showing a structure of an external terminal.
Figure 3:
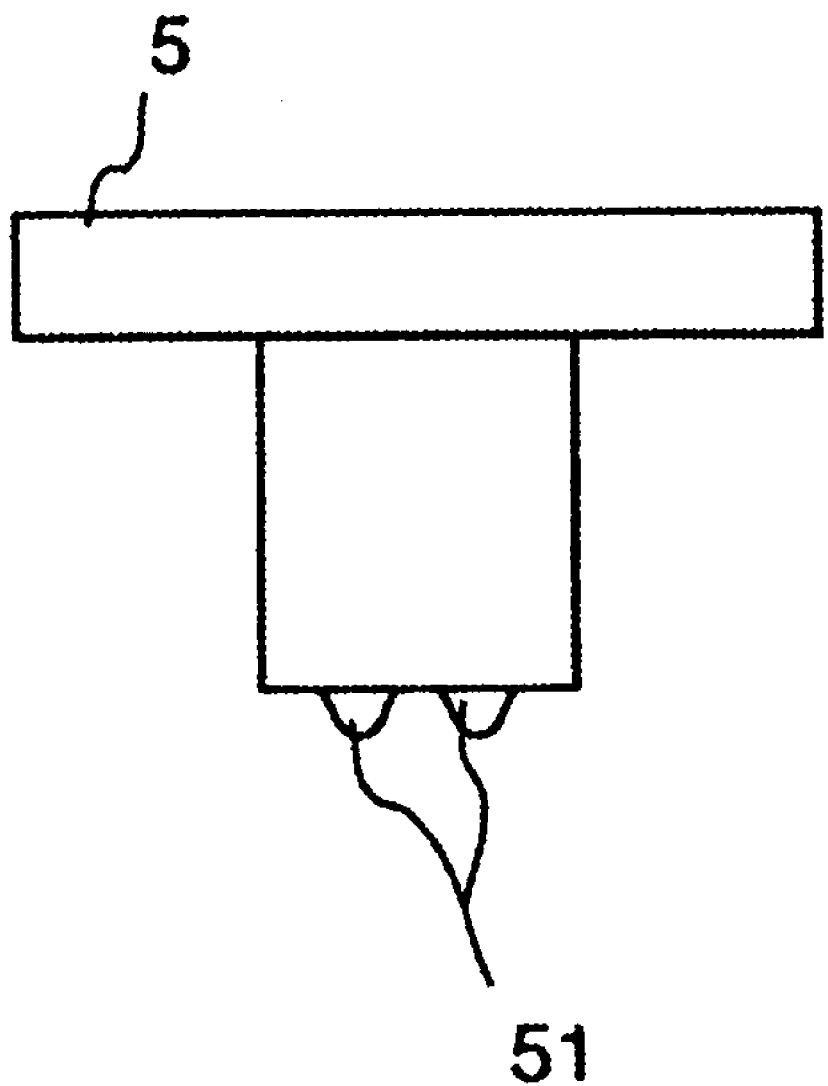
FIG. 3 is an explanatory view showing a structure of an internal terminal.

FIG. 1 is a sectional explanatory view showing a power source connecting apparatus 100 for an electronic appliance according to Embodiment 1 of this invention. A main body case 1 on this electronic appliance 110 side is provided with an external terminal 2. The electronic appliance includes, for example, a personal computer, an electronic timepiece, a shaver, an electrically driven toothbrush and so on. The external terminal 2 is formed with a groove 4 to be fitted with a magnet 3 on a charger 120 side. Meanwhile, a projection 21 is provided on the external terminal 2 at an inner side of the main body case, as shown in FIG. 2. Next, within the main body case 1 an internal terminal 5 is provided opposite to the external terminal 2. The internal terminal 5 is of a metal material and sectionally in a T-character form. Also, a projection 51 is provided at a lower end as shown in FIG. 3. This internal terminal 5 is supported by a compression coiled spring 6 in a conical form. The compression coiled spring 6 has one seat fitted with a flange 52 on the internal terminal 5 and the other seat fitted with an inner surface of the main body case 1. The internal terminal 5 is connected to a secondary battery 7. The secondary battery 7 is connected to an electronic circuit 8 for the electronic appliance 110.

Figure 4:
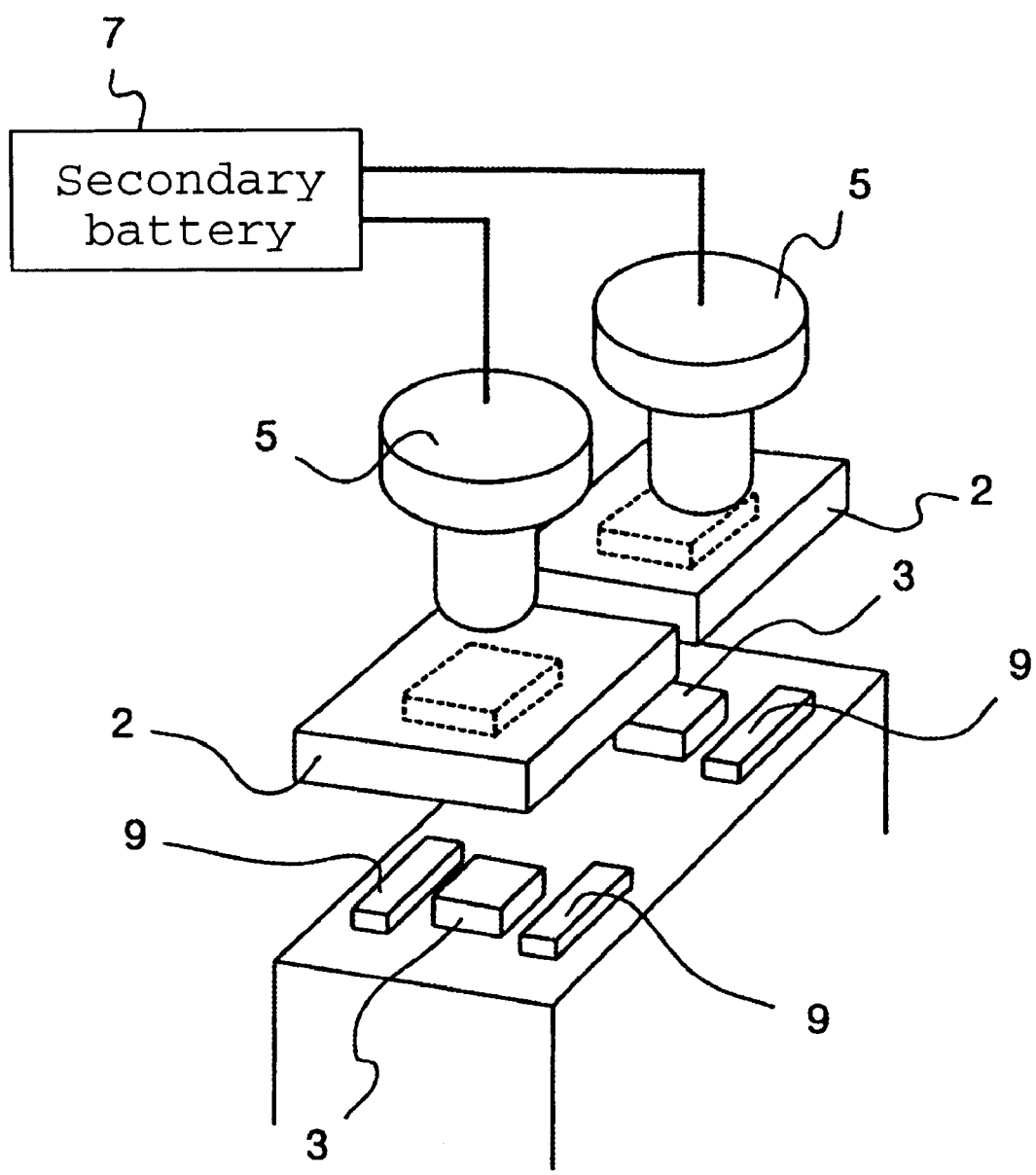
FIG. 4 is an explanatory view showing a arrangement relationship between an internal terminal, external terminal and a charger side-terminal.

The magnet 3 is attached to a tip of the charger 120. Also, charger side-terminals 9 are provided on respective side of the magnet 3. The charger side-terminals 9 are connected to a primary battery 10 internally provided in the charger 120. A ferrite magnet is used for the magnet 3. The compression coiled spring 6 that is selected is one which is compressible by a magnetic force generated by the magnet 3. Alternatively, a direct current power source may be employed in place of the primary battery 10. FIG. 4 is an explanatory view showing a arrangement relationship between the internal terminal 5, the external terminal 2 and the charger side-terminals 9. Within the main body case 1 two pairs of positive and negative poles are connected in parallel which are formed as one pair by the internal terminal 5 and the external terminal 2. Corresponding to this, the charger side terminals 9 are provided in parallel with positive and negative poles each having the magnet 3. incidentally, in this figure the compression coiled spring 6 is omitted.

Next, the operation of the power source connecting apparatus 100 of this electronic appliance will be explained. First, when the magnet 3 of the charger 120 is fitted in the groove 4 of the external terminal 2, the magnetic force caused between the magnet 3 and the internal terminal 5 overcomes a spring stress so that the internal terminal 5 is attracted to and contacted with the external terminal 2. On the other hand, the fitting of the charger 120 to the external terminal 2 provides conduction between the charger side-terminal 9 and the external terminal 2. Because the internal terminal 5 and the external terminal 2 are conducted within the main body case 1, this results in an electrical connection between the charger side terminal 9 and the internal terminal 5 through the external terminal 2. This makes it possible to supply electric power from the primary battery 10 on the charger 120 side to the secondary battery 7 on the electronic appliance 110 side. Thus, charging to the secondary battery 7 is enabled.

According to the above power source connecting apparatus 100, even if the external terminal 2 is inadvertently brought into contact with an electric conductor, no contact occurs between the internal terminal 5 and the external terminal 2 within the main body case 1. Thus no electric current leaks to the outside as in the conventional apparatus described above. Also, since the external terminal 2 is made integral with the main body case 1, the airtight integrity of the electronic appliance 110 is maintained. Furthermore, power source connecting operation is easy without requiring a lid or the like, and accordingly no parts are likely to be lost or misplaced.

(Embodiment 2)

Figure 5:
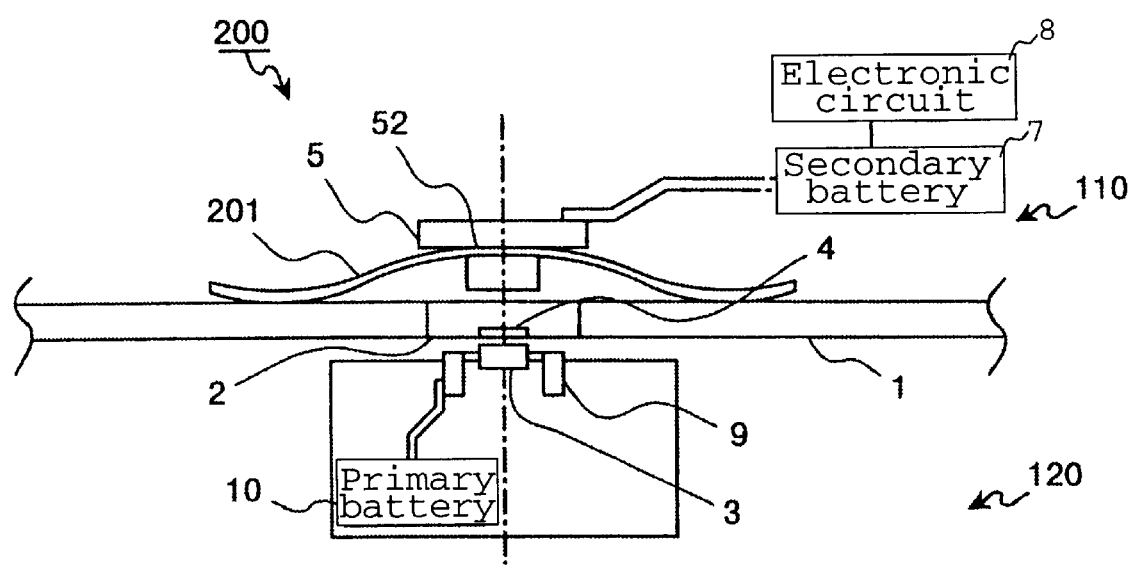
FIG. 5 is a sectional explanatory view showing a power source connecting apparatus for an electronic appliance according to Embodiment 2 of this invention.
Figure 6:
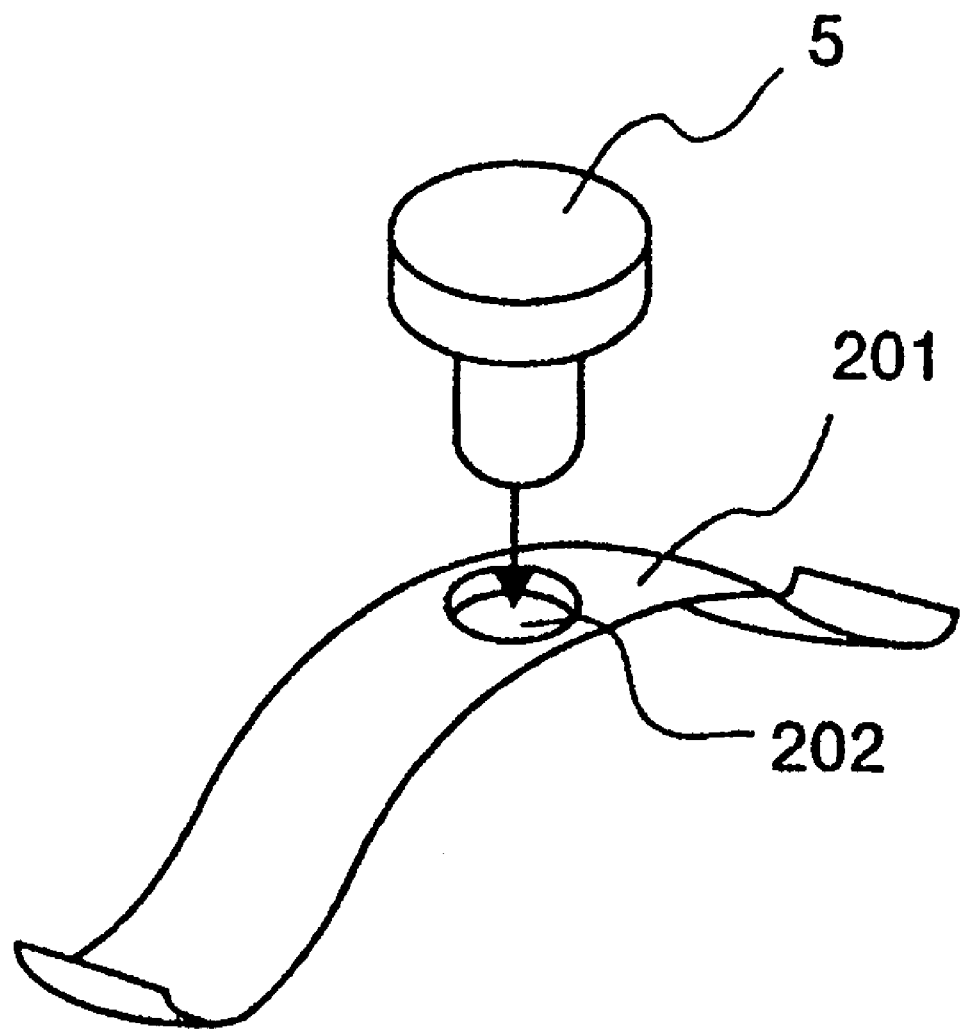
FIG. 6 is a perspective view showing a leaf spring shown in FIG. 5.

FIG. 5 is a sectional explanatory view showing a power source connecting apparatus 200 for an electronic appliance according to Embodiment 2 of the present invention. Although this power source connecting apparatus 200 of the electronic appliance is generally the same as the power source connecting apparatus 100 of Embodiment 1, it is characterized in that a leaf spring 201 is employed in place of the compression coiled spring 6. The other structures are similar to Embodiment 1, omitting explanations thereof. FIG. 6 is a perspective view showing the leaf spring 201 shown in FIG. 5. This leaf spring 201 is a inverted V-character form and has at a center a axis hole 202 in which the internal terminal is to be inserted. This leaf spring 201 is selected one which is compressible by a magnetic force caused by the magnet 3.

(Embodiment 3)

Figure 7:
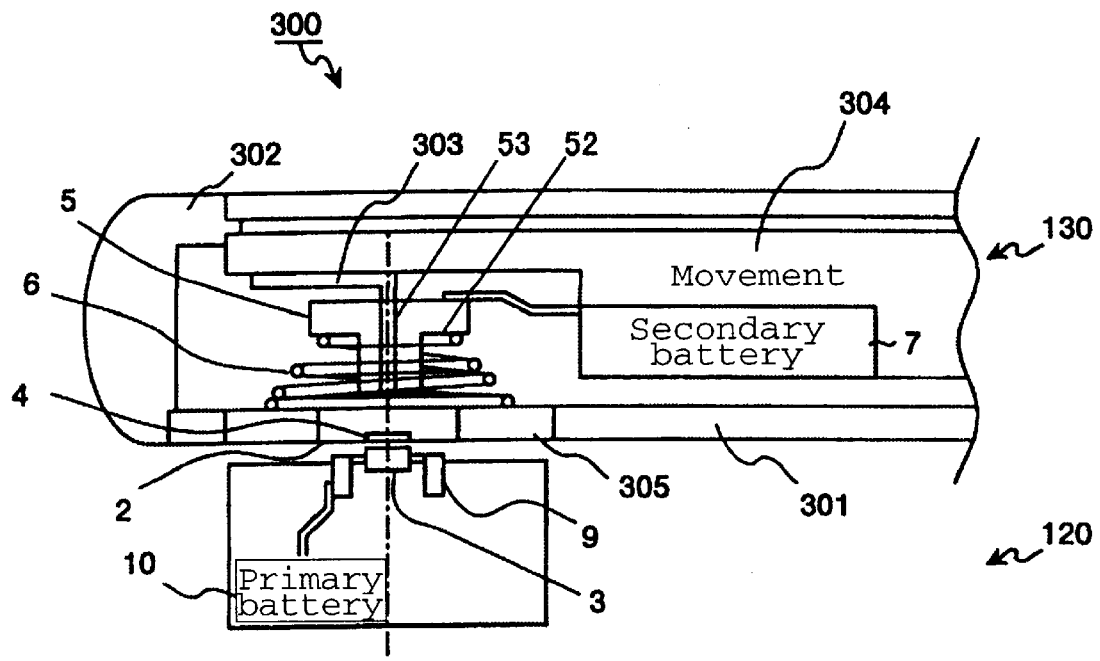
FIG. 7 is a sectional view showing a power source connecting apparatus for an electronic timepiece according to Embodiment 3 of this invention.

FIG. 7 is a sectional view showing a power source connecting apparatus 300 of an electronic timepiece according to Embodiment 3 of this invention. The electronic timepiece 130 preferably has a chargeable secondary battery 7 provided on the inside of the timepiece and a power source connecting apparatus compensate for an increase in power consumption due to recent increase in functionality. This power source connecting apparatus 300 is a detailed example where the power source connecting apparatus of Embodiment 1 as discussed above is applied to an electronic timepiece.

This electronic timepiece 130 has an external terminal 2 provided in a back lid 301. The external terminal 2 is formed with a groove 4 to be fitted with a magnet 3 on a charger 120 side. The electronic timepiece has a case 302 arranged with an internal terminal 5 opposed to the external terminal 2. The internal terminal 5 is formed of a metal material and sectionally in a T-character form. Also, a guide hole 53 is provided in a center axis of the internal terminal 5. The guide hole 53 is inserted by an internal terminal guide 303 so that the internal terminal 5 moves along this internal terminal guide 303. The internal terminal guide 303 is fixed to a movement 304. Also, the internal terminal 5 is supported by a compression coiled spring 6 in a conical form. The compression coiled spring 6 has one seat fitted on a flange 52 of the internal terminal 5 and the other seat fitted on an inner side of the back lid 301. incidentally, an insulator 305 is provided at a compression coiled spring mounting portion of the back lid 301. The internal terminal 5 is connected to the secondary battery 7 provided on the movement 304. The secondary battery 7 is connected to an electronic circuit (omittedly shown) in the movement 304. The charger 120 is similar to Embodiment 1, and explanation thereon is omitted. Also, the operation of this power source connecting apparatus 300 is generally similar to Embodiment 1.

Since the power source connecting apparatus 300 of this electronic timepiece is structured as above, even where the external terminal 2 is connected with a conductor, there is no contact between the internal terminal 5 and the external terminal 2 within the case 302 and current leak hardly occur to an outside. Also, because the external terminal 2 is made integral with the back lid 301, there is no reduction in waterproof characteristics and airtightness of the timepiece. Furthermore, because the power source connecting operation is easy without requiring an exclusive lid, there is no missing of parts.

(Embodiment 4)

Figure 8:
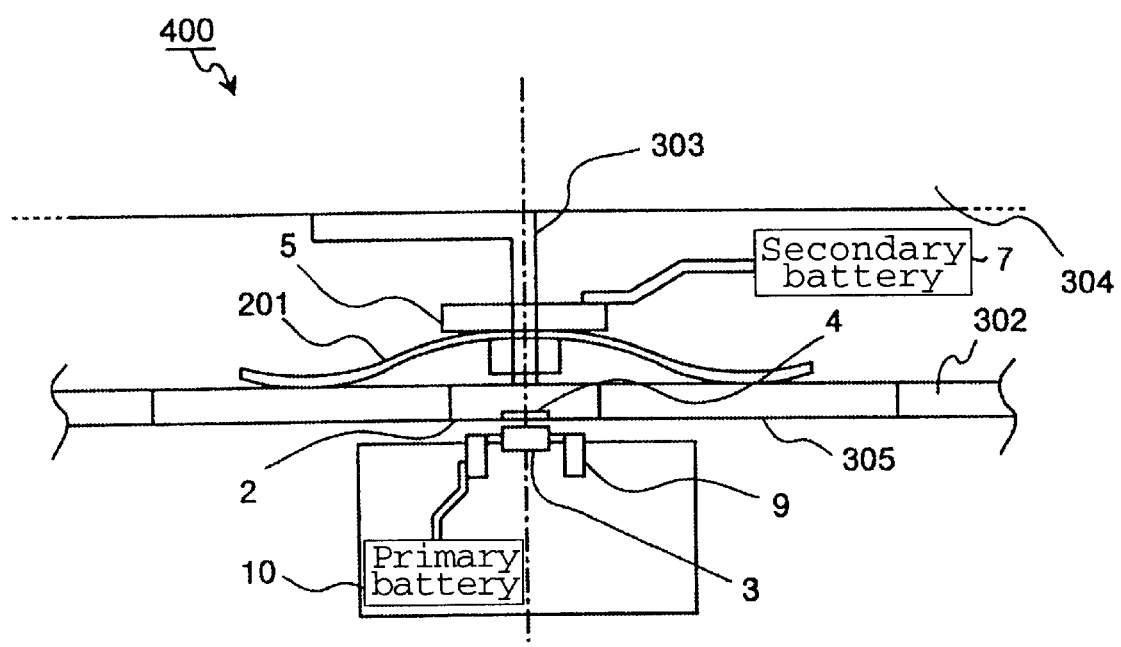
FIG. 8 is a sectional view showing a power source connecting apparatus for an electronic timepiece according to Embodiment 4 of this invention.
Figure 9:
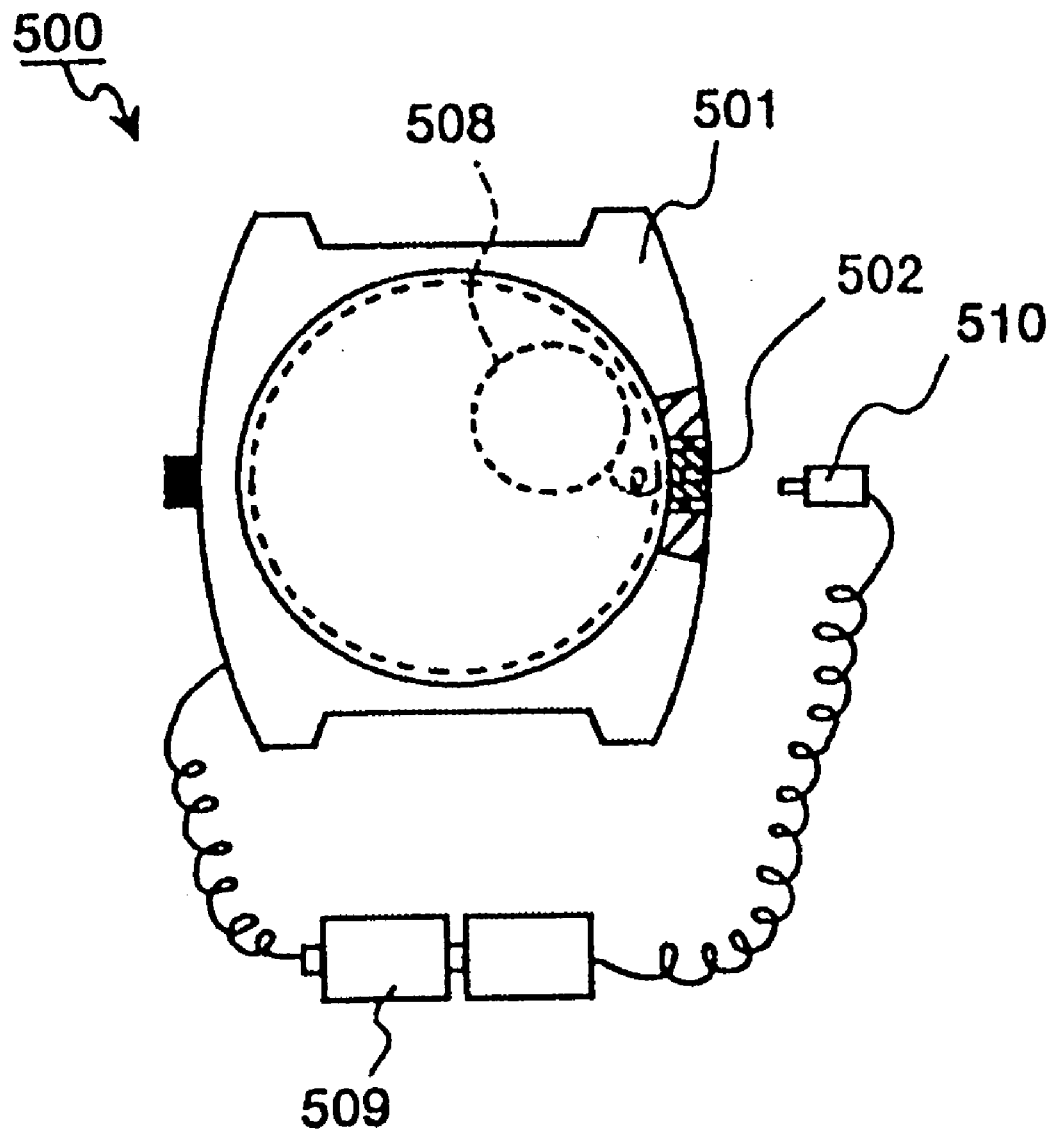
FIG. 9 is a schematic explanatory view showing one example of a conventional timepiece.
Figure 10:
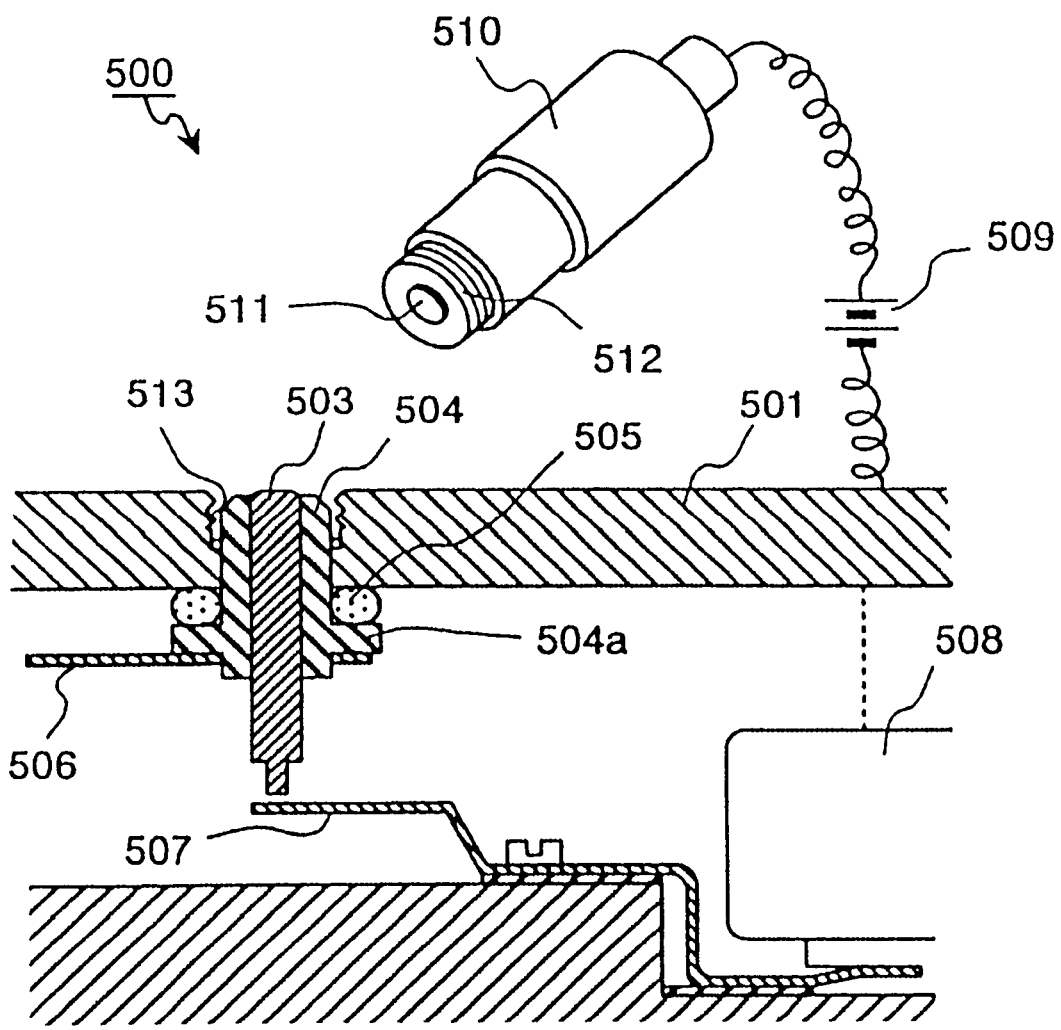
FIG. 10 is a sectional view showing an power source connecting apparatus for an electronic timepiece shown in FIG. 9.

FIG. 8 is a sectional view showing a power source connecting apparatus 400 of an electronic timepiece according to Embodiment 4 of this invention. This power source connecting apparatus 400 is a concrete example of a case where the power source connecting apparatus 200 of Embodiment 2 as discussed above is applied to an electronic timepiece. A leaf spring 201 used for this power source connecting apparatus 400 is similar to one shown in FIG. 6. An external terminal 2 is provided on a case 302 of a timepiece. An internal terminal 5 moves along an internal terminal guide 303 fixed on a movement 304. The contact portion between a leaf spring 201 and the case 302 is made of an insulator 305. According to this power source connecting apparatus 400 of the timepiece, current leakage to the outside can be reduced in the same manner described above thereby preventing the timepiece from being reduced in airtight integrity.

Incidentally, the embodiments explained as above show the examples of the cases of practicing the present invention mainly in order to charge the electronic appliance. However, it is clear that the power supply is not limited to the case of charge and the present invention can be clearly practiced also for a case that a power source connected is directly supplied to an electronic circuit of an electric appliance.

As explained above, in the power source connecting apparatus for an electronic appliance of this invention, the power source connecting apparatus was structured by holding an internal terminal to a fixing portion by a elastic member and providing an external terminal in a position oppose to this internal terminal and over between an inner surface and an outer surface of the fixing portion. Also, a power source connecting apparatus was structured by providing a magnet on an connection terminal opposed to the external terminal to cause an attractive force between the internal terminal and the same. Due to this, the internal terminal and the external terminal are not contacted by merely touching the external terminal from an outer side of the fixing portion. Thus no current leaks to the outside. Also, because the external terminal was provided over between the inner surface and the outer surface of the fixing portion, airtightness can be maintained between the inner surface and the outer surface. Furthermore, because there are no parts to be separated, missing is prevented.

What is claimed is:

1. A power source connecting apparatus for connecting an external power source to an electronic device, comprising:

a fixing portion formed in a housing of an electronic device at which an external power source may be connected to the electronic device, the fixing portion comprising a substantially flat, non-conductive portion of the housing of the electronic device having an external surface facing outside the electronic device and an internal surface facing internally of the electronic device;

an external connection terminal formed of a conductive material at the fixing portion of the housing so as to be exposed externally and internally of the electronic device and flush with the housing, and having a positioning portion at the external surface of the housing for mating with a corresponding positioning portion formed in the external power source, the external connection terminal forming a waterproof integral structure with the housing at the fixing portion;

a movable metallic internal terminal disposed in the housing opposed to the external connection terminal and being connected to a first power source disposed in the housing, the internal terminal being mounted to undergo movement between a first position at which the internal terminal is in electrical contact with the external connection terminal and a second position at which the internal terminal is not in electrical contact with the external connection terminal; and an elastic member for supporting the internal terminal and normally biasing the internal terminal in the second position out of electrical contact with the external connection terminal, the elastic member being supported at one end thereof by the substantially flat, non-conductive portion of the housing at the fixing portion so as to surround the external connection terminal;

wherein the internal terminal is moved into the first position to make electrical contact with the external connection terminal against the bias force of the elastic member when a magnet for applying a magnetic force between itself and the internal terminal sufficient to overcome the bias force of the elastic member is placed in contact with the fixing portion such that a positioning portion of the magnet is in proper contact with the positioning portion of the external connection terminal.

2. A power source connecting apparatus as recited in claim 1; wherein the external power source has a magnet formed therein, and a positioning portion configured to mate with the positioning portion formed in the external connection terminal, so that when the magnet is in position with respect to the external connection terminal the internal terminal is brought into electrical contact with the external terminal against the bias force of the elastic member.

3. A power source connecting apparatus as recited in any one of claims 1 and 2; wherein the external power source has a power source terminal disposed at the fixing portion opposite the external connection terminal when the positioning portions of the external connection terminal and the external power source are properly mated.

4. An electronic appliance having a power source connecting apparatus according to claim 3; further comprising an electronic circuit incorporated in the electronic device housing which is driven by the first power source.

5. An electronic appliance having a power source connecting apparatus according to any one of claims 1 and 2; wherein the electronic device has an electronic circuit incorporated in the housing which is driven by the first power source when the external power source is not in position with respect to the external connection terminal, and which is further electrically connected to a power supply inside the external power source through the external connection terminal and the internal terminal when the external power source is in position with respect to the external connection terminal.

6. An electronic appliance having a power source connecting apparatus according to any one of claims 1 and 2; wherein the first power source comprises a secondary battery incorporated in the housing.

7. An electronic appliance comprising:
a main body housing an electronic device;
an internal electronic circuit of the electronic device contained in the main body;
a secondary battery contained in the main body for driving the internal electronic circuit;
a power source connecting apparatus having a movable internal terminal disposed inside the main body and being connected to the secondary battery, an elastic member for holding the internal terminal and moving the internal terminal between first and second positions, and an external terminal mounted to the main body in a position opposite the internal terminal, such that the internal terminal is biased by the elastic member in the second position spaced apart from the external terminals the internal terminal is disposed beneath an inner surface of the main body and the external terminal extends from the inner surface to an outer surface of the main body, the elastic member being mounted at the inner surface of the main body to surround the external terminal and to bias the inner terminal in the second position, the internal terminal being responsive to an applied magnetic force to move toward and contact the external terminal; and a connectable external power source having an internal power supply and a connecting apparatus for releasably connecting the power supply to the main body so that power may be supplied by the external power supply to charge the secondary battery or drive the internal electronic circuit, and having a charger terminal opposed, when disposed against the main body, to the external terminal and connected to the internal power supply, and a magnet for producing an attractive force between itself and the internal terminal so as to overcome a bias force of the elastic member and cause the internal terminal and the external terminal to come into electrical contact.

8. An electronic appliance comprising:
a main body housing an electronic device;
an electrical circuit of the electronic device contained in the main body;
a secondary battery contained in the main body for supplying power to the electrical circuit;
an internal terminal formed in the main body of a metallic member and being electrically connected to the secondary battery;
a spring member urging the internal terminal inward of an internal surface of the main body, the spring member being supported at one end by a substantially flat portion of the internal surface of the main body;
an external connection terminal opposed to the internal terminal and being exposed at an external surface of the main body;
a charger case;
a charger power source contained in the charger case;
a charger terminal exposed at an external surface of the charger case and connected to the charger power source; and
a magnet disposed on a side of the charger case so as to oppose the internal terminal when the charger case is placed against the main body.

9. A power source connecting apparatus comprising:
a main body housing an electronic device and having an external side to which an external power source may be contacted and an internal side on which an internal circuit of the electronic device is disposed;
a movable internal terminal disposed in the main body and being connected to a first power source contained in the main body and to the internal circuit;
an elastic member supported by a flat portion of an internal surface of the main body for movably supporting the internal terminal; and
an external connection terminal formed in the main body opposite the internal terminal so as to be exposed externally of the main body;

wherein the internal terminal is movable between a first position at which it is in contact with the external connection terminal and a second position at which it is not in contact with the external connection terminal; and wherein the internal terminal and the external connection terminal are brought into contact when a magnet is brought into contact with the external connection terminal.

10. A power source connecting apparatus according to claim 9; wherein the elastic member comprises a spring biasing the internal terminal in the second position.

11. A power source connecting apparatus according to claim 10; wherein the external power source has a magnetic member for attracting the internal terminal when the magnetic member is disposed against the external connection terminal so that the internal terminal is disposed in the first position and electrical contact is made between the internal terminal and the external connection terminal.

12. A connecting structure according to claim 11; wherein the external power source comprises a charger, and the first power source comprises a secondary cell.

13. A power source connecting apparatus comprising:

a main body housing an electronic device and having an external side to which an external power source may be contacted and an internal side on which an internal circuit of the electronic device is disposed;

a movable internal terminal disposed in the main body and being connected to a first power source contained in the main body and to the internal circuit;

an elastic member supported by a flat portion of an internal surface of the main body for movably supporting the internal terminal; and an external connection terminal formed in the main body opposite the internal terminal so as to be exposed externally of the main body;

wherein the external power source comprises a charger, and the first power source comprises a secondary cell.

14. A connecting structure for connecting an electronic device to an external power supply device, comprising:

a housing;

an electronic circuit contained in the housing;

a first power source contained in the housing for driving the electronic circuit;

an internal terminal disposed inside the housing and connected to at least one of the first power source and the electronic circuit;

an external connection terminal having a groove formed therein for contacting a similarly shaped projection formed in an external power source so that power may be supplied by the external power source to at least one of the first power source and the electronic circuit through the external connection terminal, the external connection terminal being formed integrally with the housing so that the groove is exposed on an external surface of the housing; and an elastic member for movably supporting the internal terminal in a spaced-apart manner from the external connection terminal;

wherein the internal terminal and the external connection terminal are brought into electrical contact when a magnet disposed in the external power source device is brought into contact with the external connection terminal so that the projection formed on the external power source mates with the groove formed on the external connection terminal.

15. A connecting structure according to claim 15; wherein the internal terminal is attracted by the magnet to move to a first position at which it is in contact with the external connection terminal and is normally biased by the elastic member in a second position at which it is not in contact with the external connection terminal.

16. A power source connecting apparatus for connecting an external power source device to an electronic device comprising:

a housing for containing an electronic device;

a first power supply disposed in the housing for supplying power to the electronic device;

an internal terminal disposed in the housing and being connected to the first power supply;

an external connection terminal disposed on the housing and having a positioning groove formed therein for contacting a similarly shaped projection formed in an external power source so that power may be supplied by the external power source to the electronic device; and an elastic member for movably supporting the internal terminal proximate the external connection terminal and biasing the internal terminal to be spaced apart from the external terminal, one end of the elastic member being supported by the housing proximate the external connection terminal and another end being attached to the internal terminal.

* * * * *